(12) United States Patent
Price et al.

(10) Patent No.: US 10,038,378 B2
(45) Date of Patent: Jul. 31, 2018

(54) DEVICE AND METHOD TO STABILIZE A SUPPLY VOLTAGE

(71) Applicant: QUALCOMM Incorporated, San Diego, CA (US)

(72) Inventors: Burt Price, Apex, NC (US); Dhaval Shah, Raleigh, NC (US); Yeshwant Kolla, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/272,110

(22) Filed: Sep. 21, 2016

(65) Prior Publication Data

US 2018/0083533 A1    Mar. 22, 2018

(51) Int. Cl.
   *H02M 3/158*    (2006.01)
(52) U.S. Cl.
   CPC ................ *H02M 3/158* (2013.01)
(58) Field of Classification Search
   CPC . G05F 1/563; G05F 1/61; G05F 1/614; G05F 1/59; H02M 3/155–3/158
   USPC .......... 323/265, 268, 271, 282–285, 351
   See application file for complete search history.

(56) References Cited

U.S. PATENT DOCUMENTS

| | | | |
|---|---|---|---|
| 6,809,504 B2 * | 10/2004 | Tang | G06F 1/305 323/274 |
| 6,930,473 B2 | 8/2005 | Elbanhawy | |
| 7,821,244 B1 | 10/2010 | Signoretti et al. | |
| 8,629,668 B2 | 1/2014 | Menegoli et al. | |
| 2002/0126512 A1* | 9/2002 | Nakagawa | H02M 1/36 363/16 |
| 2003/0210094 A1* | 11/2003 | Lee | H03F 1/0261 330/264 |
| 2006/0255783 A1* | 11/2006 | Chapuis | G01R 19/0092 323/282 |
| 2009/0001946 A1* | 1/2009 | Mehas | H02M 1/36 323/266 |
| 2011/0148386 A1 | 6/2011 | Dhuyvetter et al. | |
| 2012/0062192 A1 | 3/2012 | Okuma | |
| 2013/0113447 A1* | 5/2013 | Kadanka | G05F 1/56 323/280 |

(Continued)

FOREIGN PATENT DOCUMENTS

EP    2897271 A2    7/2015

OTHER PUBLICATIONS

Kim, W. et al., "A Fully-Integrated 3-Level DC-DC Converter for Nanosecond-Scale DVFS," IEEE Journal of Solid-State Circuits, Jan. 2012, vol. 47, No. 1, pp. 206-219.

(Continued)

*Primary Examiner* — Adolf Berhane
(74) *Attorney, Agent, or Firm* — Qualcomm Incorporated-Tol

(57) ABSTRACT

In a particular implementation, an apparatus to stabilize a supply voltage includes a first current source, a second current source, and a control circuit. The first current source is responsive to a detection signal and has an output coupled to a voltage regulator circuit via an output node. The second current source is also coupled to the output node. The control circuit includes an input responsive to the detection signal and an output coupled to the second current source. The control circuit is configured to enable the second current source based on a delayed version of the detection signal.

23 Claims, 6 Drawing Sheets

(56) References Cited

U.S. PATENT DOCUMENTS

| | | |
|---|---|---|
| 2014/0266113 A1 | 9/2014 | Zuniga et al. |
| 2015/0042296 A1 | 2/2015 | Cheng et al. |
| 2015/0102792 A1 | 4/2015 | Chen et al. |
| 2016/0048182 A1 | 2/2016 | Liu |

OTHER PUBLICATIONS

International Search Report and Written Opinion—PCT/US2017/044085—ISA/EPO—Nov. 24, 2017.

\* cited by examiner

US 10,038,378 B2

DEVICE AND METHOD TO STABILIZE A SUPPLY VOLTAGE

I. FIELD

The present disclosure is generally related to devices and methods to stabilize a supply voltage.

II. DESCRIPTION OF RELATED ART

Advances in technology have resulted in smaller and more powerful computing devices. For example, a variety of portable personal computing devices, including wireless telephones, such as mobile and smart phones, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities.

To reduce voltage fluctuations, such devices include processor cores that utilize voltage regulators. A voltage regulator may be a simple feed-forward design or may include negative feedback control loops. Depending on the design, the voltage regulator may be used to regulate one or more alternating current (AC) or direct current (DC) voltages. Voltage regulators, such as buck regulators, may exhibit unacceptable voltage "droop" due to sharp steps in load current. For example, when a processor core "powers up," a large load current may cause a supply voltage to drop until the voltage regulator can provide sufficient current to stabilize the voltage. Large voltage droop may cause the regulated supply voltage to fall below minimum required levels for circuit operation.

III. SUMMARY

According to one implementation of the present disclosure, an apparatus to stabilize a supply voltage includes a first current source, a second current source, and a control circuit. The first current source is responsive to a detection signal and has an output coupled to a voltage regulator circuit via an output node. The second current source is also coupled to the output node. The control circuit includes an input responsive to the detection signal and an output coupled to the second current source. The control circuit is configured to enable the second current source based on a delayed version of the detection signal.

According to another implementation of the present disclosure, a method includes receiving a detection signal at a control circuit. The detection signal indicates that an output voltage of a voltage regulator circuit is below a threshold voltage. The method also includes enabling a first current source that is responsive to the detection signal and enabling a second current source responsive to a delayed version of the detection signal.

According to another implementation of the present disclosure, an apparatus includes means for providing a first current to an output node. The means for providing the first current is responsive to a detection signal and is coupled, via an output node, to a means for regulating a voltage at the output node. The apparatus also include means for providing a second current to the output node. The apparatus further includes means for enabling the means for providing the second current based on a delayed version of the detection signal.

According to another implementation of the present disclosure, a non-transitory computer-readable medium includes instructions that, when executed by a processor, cause the processor to perform operations including enabling a first current source responsive to a detection signal. The detection signal indicates that an output voltage of a voltage regulator circuit is below a threshold voltage. The operations also include enabling a second current source responsive to a delayed version of the detection signal.

IV. BRIEF DESCRIPTION OF THE DRAWINGS

V. DETAILED DESCRIPTION

Particular implementations of the present disclosure are described below with reference to the drawings. In the description, common features are designated by common reference numbers throughout the drawings.

Figure 1:
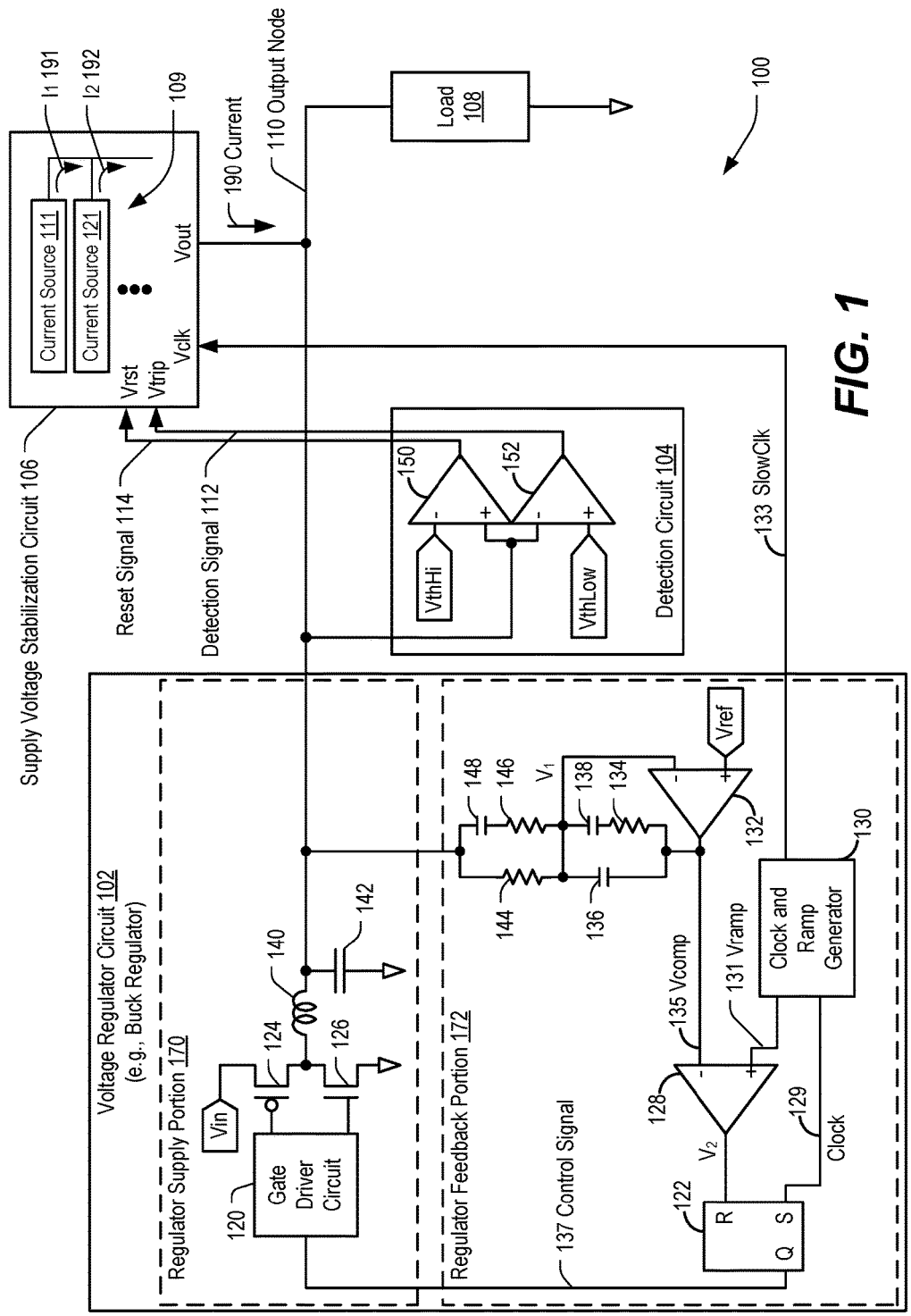
FIG. 1 is a diagram of a system that is operable to reduce output voltage droop.

Referring to FIG. 1, a system 100 that is operable to reduce output voltage droop is shown. The system 100 includes a voltage regulator circuit 102, a detection circuit 104, a supply voltage stabilization circuit 106, and a load 108. The voltage regulator circuit 102 may be configured to regulate a voltage at an output node 110. The supply voltage stabilization circuit 106 may be configured to quickly ramp up a current 190 to the output node 110 in response to a sudden drop of the voltage at the output node 110. For example, when a load current through the load 108 increases faster than the transient response of the voltage regulator circuit 102 can accommodate the increased load current, the voltage at the output node 110 drops. In response to the voltage drop, the supply voltage stabilization circuit 106 may increase the current 190 until the voltage at the output node 110 is stabilized and may then ramp down the current 190 as the voltage regulator circuit 102 adapts to the increased load current. The supply voltage stabilization circuit 106 is also referred to herein as an asynchronous transient response accelerator (ATRA) 106.

The voltage regulator circuit 102 may include a regulator supply portion 170 that is coupled to the output node 110 and that is responsive to a control signal 137 from a regulator feedback portion 172. In some implementations, the voltage regulator circuit 102 may include or correspond to a buck regulator.

The regulator supply portion 170 includes a gate driver circuit 120 that is coupled to a gate of a pull-up transistor 124 and a gate of a pull-down transistor 126. A first terminal of an inductor 140 is coupled to the drains of the transistors 124, 126, and a second terminal of the inductor 140 is coupled to the output node 110. A first terminal of a capacitor 142 is coupled to the output node 110, and a second terminal of the capacitor 142 is coupled to ground.

The gate driver circuit 120 is configured to selectively activate and deactivate each of the transistors 124, 126 responsive to the control signal 137. For example, the gate driver circuit 120 may be configured to couple the inductor 140 to a supply voltage (Vin) while the control signal 137 has a first voltage level (e.g., a logical high voltage) by activating the pull-up transistor 124 and deactivating the pull-down transistor 126, and to couple the inductor 140 to ground while the control signal 137 has a second voltage level (e.g., a logical low voltage) by deactivating the pull-up transistor 124 and activating the pull-down transistor 126.

The regulator feedback portion 172 is coupled to the output node 110 and configured to generate the control signal 137 as a pulse-width modulation (PWM) signal having a duty cycle based on the voltage at the output node 110. The regulator feedback portion 172 includes an error amplifier 132 for the voltage generator circuit 102 that is configured to generate a voltage (Vcomp) 135 based on a difference between a first voltage ($V_1$) and a reference voltage (Vref). A resistor 134 and capacitors 136, 138, in conjunction with resistors 144, 146 and a capacitor 148, are compensation components configured to implement a Type III compensation network for the error amplifier 132.

The voltage regulator circuit 102 also includes a comparator circuit 128, a clock and ramp generator 130, and a pulse-width modulation (PWM) latch 122. A first input terminal of the comparator circuit 128 is coupled to receive a ramp voltage (Vramp) 131 generated by the clock and ramp generator 130, and a second input terminal of the comparator circuit 128 is coupled to receive Vcomp 135 from the error amplifier 132. Vramp 131 may have a voltage level that increases from a low voltage level and resets (to a low voltage level) after reaching a high voltage level. Thus, Vramp 131 may steadily increase, reset, and repeat in a continuous manner.

The comparator circuit 128 may generate a pulse width modulated signal ($V_2$) by outputting a low voltage while the ramping voltage Vramp 131 is less than Vcomp 135 and transitioning to a high voltage when Vramp 131 exceeds Vcomp 135. The PWM latch 122 is responsive to the output ($V_2$) of the comparator circuit 128 and a clock signal 129 from the clock and ramp generator 130 and may include a set-reset (S-R) flip-flop configured to output the control signal 137. As an illustrative example of operation, the clock signal 129 may first set the PWM latch 122, which then turns on the pull-up transistor 124. The Vramp signal 131 may start increasing from its lowest value simultaneous (e.g., at least partially overlapping in time) to the PWM latch 122 being set. In response to the voltage of Vramp 131 rising above Vcomp 135, the output $V_2$ of the comparator circuit 128 transitions to a logical high voltage. The transition of the output $V_2$ resets the PWM latch 122, which turns off the pull-up transistor 124 and turns on the pull-down transistor 126. The error amplifier 132 slowly adjusts Vcomp 135 (slowly relative to how fast the Vramp signal 131 slews) to produce a PWM duty cycle that results in the voltage at the output 110 being approximately equal to (or equal to) the reference voltage Vref.

The detection circuit 104 may also be referred to as a "droop comparator". The detection circuit 104 includes a comparator circuit 150 and a comparator circuit 152. The output node 110 is coupled to a first input terminal of the comparator circuit 150 and to a second input terminal of the comparator circuit 152. A second input terminal of the comparator circuit 150 is coupled to receive a threshold voltage (VthHi) (e.g., a "high" threshold voltage), and a first input terminal of the comparator circuit 150 is coupled to receive another threshold voltage (VthLow) (e.g., a "low" threshold voltage). The comparator circuit 152 is configured to generate a detection signal 112 (e.g., output a logical high voltage) in response to the voltage at the output node 110 being less than VthLow. The comparator circuit 152 may be configured to generate a reset signal 114 (e.g., output a logical high voltage) in response to the voltage at the output node 110 being greater than VthHi.

The ATRA 106 may be coupled to receive the detection signal 112 and the reset signal 114 from the detection circuit 104 and to receive a clock signal (SlowClk) 133 from the clock and ramp generator 130. The ATRA 106 includes multiple current sources 109 including a first current source 111 and a second current source 121. In an illustrative implementation, the current sources 109 (e.g., the first current source 111 and the second current source 121) include p-type metal oxide semiconductor (PMOS) transistors.

The ATRA 106 may be configured to sequentially activate the current sources 109 in response to the detection signal 112. For example, the first current source 111 is configured to generate a first current $I_1$ 191 in response to a detection signal, such as the detection signal 112 indicating that the voltage at the output node 110 is less than VthLow. The second current source 121 is configured to generate a second current $I_2$ 192 in response to a delayed version of the detection signal. For example, the delayed version of the detection signal may be generated by a delay element, such as one or more buffers, that is responsive to the detection signal, as described in further detail with reference to FIG. 2. The multiple current sources 109 may include one or more additional current sources (not shown) that are each configured to generate a respective current in response to one or more other delayed versions of the detection signal. The combined current (if any) from the multiple current sources 109 is provided as the current 190 to the output node 110. Example implementations of the ATRA 106 are described in further detail with reference to FIGS. 2-4.

The ATRA 106 may be configured to deactivate the multiple current sources 109 based on a clock signal, such as the clock signal 133 received from the clock and ramp generator 130. For example, the ATRA 106 may be configured to continue sequentially activating additional current sources, increasing the current 190, while the detection signal 112 indicates that the voltage at the output node 110 is less than VthLow. In response to the detection signal 112 indicating that the voltage at the output node 110 has risen above VthLow, the ATRA 106 may be configured to cease activating additional current sources and may begin sequentially deactivating the current sources that are activated, decreasing the current 190 in a series of steps that may correspond to cycles of the clock signal 133.

During operation, the voltage at the output node 110 may be held at a substantially constant voltage level by the voltage regulator circuit 102 during a steady-state operation. The signals 112, 114 of the detection circuit 104 may indicate that the voltage at the output node 110 is not below VthLow and is not above VthHi (e.g., the detection signal 112 and the reset signal 114 are both logical low voltages). The current sources 109 of the ATRA 106 are deactivated and substantially no current flows from the output terminal (Vout) of the ATRA 106 to the output node 110.

A sudden increase in the load current that is provided to the load 108 may disrupt the steady-state operation. For example, the load 108 may include one or more processor cores that transition from a low-power mode to an active mode, such as multiple cores that transition to the active mode at substantially the same time. The sudden increase in load current drains charge from the capacitor 142 of the voltage regulator circuit 102 and lowers the voltage at the output node 110 more quickly than the regulator feedback portion 172 can adjust the control signal 137 to provide additional current to the output node 110. When the voltage at the output node 110 falls below VthLow, the detection circuit 104 generates the detection signal 112 indicating the voltage drop (e.g., transitions the detection signal 112 from a logical low voltage to a logical high voltage).

The ATRA 106 may respond to the detection signal 112 indicating the voltage drop by sequentially activating current sources of the multiple current sources 109. For example, the ATRA 106 may activate the current source 111 to provide the current $I_1$ 191 as the current 190 to the output node 110. After a short delay, if the detection signal 112 continues to indicate the voltage drop, the ATRA 106 may activate the second current source 121 to provide the combined current $I_1$ 191+$I_2$ 192 as the current 190 to the output node 110. The ATRA 106 may continue to activate additional current sources to increase the current 190 to the output node while the detection signal 112 indicates the voltage drop. As a result, the output current 190 may increment or "ramp up" in a series of steps of increasing current as more of the current sources 109 are activated. The output current 190 may contribute to the load current provided to the load 108, may contribute to recharging the capacitor 142, or a combination thereof.

When the detection circuit 104 detects that the voltage at the output node 110 is not lower than VthLow, the detection circuit 104 adjusts the detection signal 112 (e.g., by transitioning the detection signal 112 from a logical high voltage to a logical low voltage). The ATRA 106 may respond to the detection signal 112 indicating that the voltage at the output node 110 is not lower than VthLow by halting the sequential activation of current sources. Current sources that have been activated remain activated, while inactive current sources remain inactive. As a result, the current 190 may be substantially unchanged immediately after the transition of the detection signal 112. The ATRA 106 may begin deactivating the current sources at a slower rate than the ATRA 106 activated the current sources. The rate of deactivating the current sources may be based on an estimated or predicted speed of the voltage regulator circuit 102 to adjust for the changes in current resulting from deactivation of the current sources.

Under some conditions the voltage at the output node 110 may exceed VthHi. For example, the load 108 may include a processor core that transitions from a low power mode to an active mode and then quickly transitions back to the low power mode. In response to the increased load current resulting from the processor transition to the active mode, the ATRA 106 quickly ramps up the current 190. Upon the processor transitioning back to the low-power mode, the current 190 provided by the ATRA 106 is no longer consumed by the load 108 and instead may charge the capacitor 142, driving the voltage at the output node 110 above VthHi. In response to the reset signal 114 indicating that the voltage at the output node 110 exceeds VthHi, the ATRA 106 may deactivate all of the current sources 109 substantially simultaneously (rather than sequentially based on the clock signal 133) to terminate the current 190.

The system 100 of FIG. 1 may thus utilize the ATRA 106 to provide current to the output node 110 in response to a sudden voltage drop at the output node 110. The ATRA 106 may respond more quickly to the voltage drop than the voltage regulator circuit 102 and provides current 190 to the output node 110, reducing the amount of current 190 as the voltage regulator circuit 102 adjusts to accommodate the increased current of the load 108 that caused the voltage drop. For example, the ATRA 106 may provide appropriate "on-die" current supply to prevent unacceptable droop to sharp "steps" in load current without creating undesired noise to the output voltage of the voltage regulator circuit 102 and while efficiently moving the load current to the voltage regulator circuit 102. Thus, the ATRA 106 may prevent digital circuits (e.g., a processor core) from "crashing" or falling below minimum required levels for improved circuit operation. Further, by providing a quick response to voltage drops, the ATRA 106 may enable the system 100 to be designed using a smaller, on-die capacitor 142 to reduce an overall cost and size of the system 100 as compared to systems that use a large, off-chip capacitor to accommodate sharp steps in load current.

To illustrate, a relation between the maximum load current step, the output capacitance of the voltage regulator 102, and the delay times to activate the current sources 109 (e.g., the delay of the comparator circuit 152 and of delay buffers in the ATRA 106) may be used during design of the system 100, such as when determining a size (e.g., capacitance) of the load capacitor 142. For example, one estimate for determining a size of the load capacitor 142 may be expressed as Cload>=Iload*Tdelay*N/(VthLow−VminOp), where Iload is the largest load current step, Tdelay is the delay of the comparator circuit 152 and the delay buffers of the ATRA 106, N is the number of current sources or stages in the ATRA 106 (described in further detail with reference to FIGS. 2-3), and VminOp is the minimum (e.g., lowest) allowable voltage level for the output voltage Vout of the voltage regulator circuit 102.

Although the voltage regulator circuit 102 is described as including a buck regulator, in other implementations the voltage regulator circuit 102 may include any other type of voltage regulator. Although the ATRA 106 is depicted as including two current sources 109, the ATRA 106 may be implemented using three, four, ten, or any other number of current sources 109. Although the clock signal 133 is depicted as generated by the clock and ramp generator 130, in other implementations the clock signal 133 may be generated by another component (such as a ring oscillator circuit) within or external to the ATRA 106. In some implementations, the clock signal 133 may be omitted, such as in an implementation where activated current sources are deactivated based on another signal. For example, activated current sources may be deactivated based on deactivation of the detection signal 112 (e.g., when the voltage at the output node 110 rises above VthLow), based on activation of the reset signal 114, or based on one or more other signals (not shown). To illustrate, all activated current sources may be deactivated responsive to a high-to-low voltage transition of the detection signal 112. As another example, activated current sources may be sequentially deactivated based on high-to-low voltage transitions of one or more delayed versions of the detection signal 112. Although the detection circuit 104 is depicted as generating the reset signal 114 and the ATRA 106 is depicted as responsive to the reset signal 114, in other implementations the reset signal 114 may be omitted.

Figure 2:
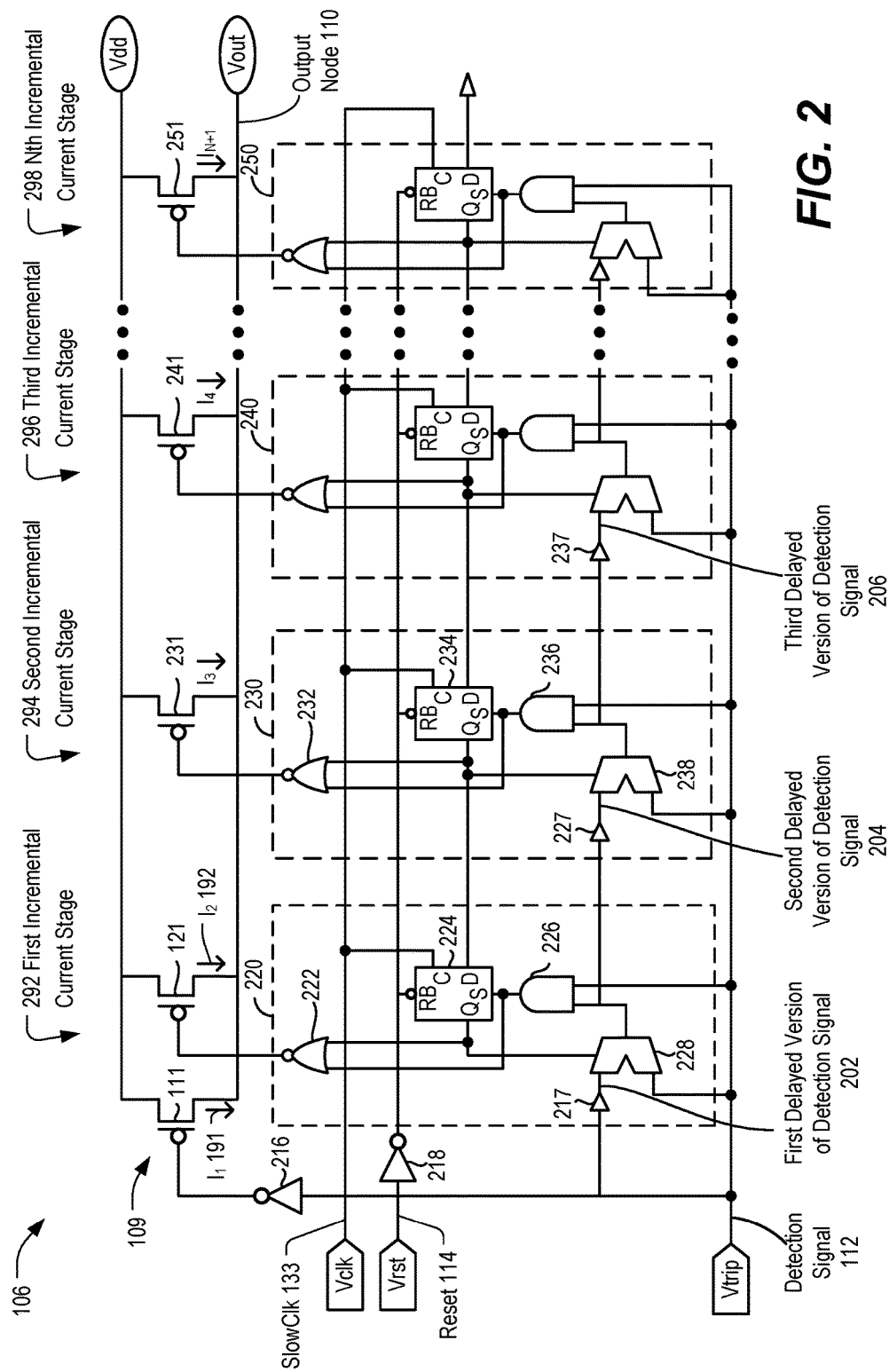
FIG. 2 is a circuit diagram of a device to stabilize a supply voltage that may be included in the system of FIG. 1.

Referring to FIG. 2, a circuit diagram of a particular implementation of the ATRA 106 is shown. The ATRA 106 includes the multiple current sources 109 and a plurality of control circuits. For example, the ATRA 106 includes the current source 111, the current source 121, a current source 231, a current source 241, and a current source 251. Although five current sources are shown, in other implementations, the ATRA 106 may include additional (or fewer) current sources. A control circuit 220 is coupled to the current source 121, a control circuit 230 is coupled to the current source 231, a control circuit 240 is coupled to the current source 241, and a control circuit 250 is coupled to the current source 251. Although four control circuits are shown, in other implementations, the ATRA 106 may include additional (or fewer) control circuits.

Figure 4:
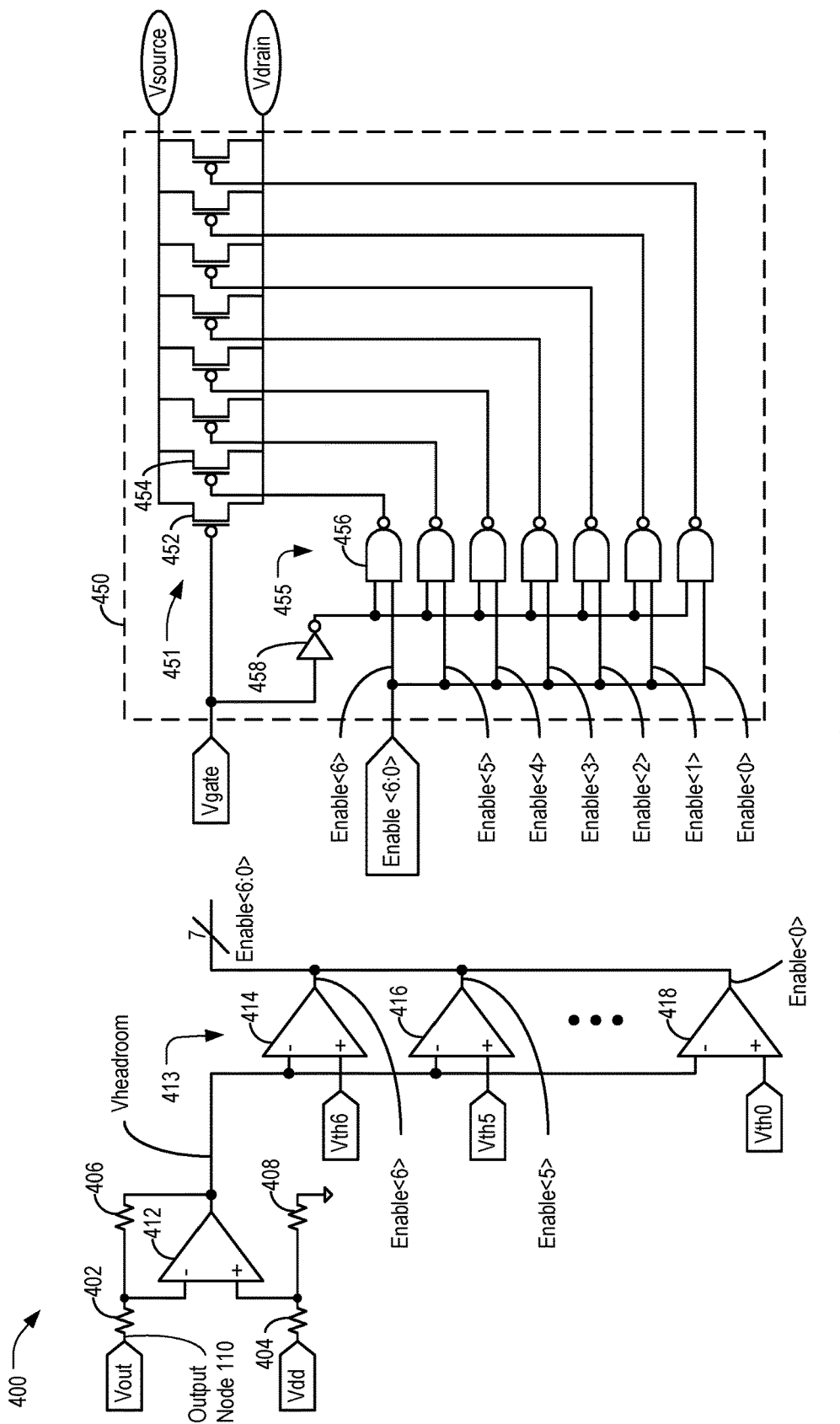
FIG. 4 is a diagram of an illustrative example of a current source of a device to stabilize a supply voltage.

According to some implementations, each current source 111, 121, 231, 241, 251 may include a PMOS transistor. For example, each current source 111, 121, 231, 241, 251 may include a current mirroring type of current source that includes a PMOS transistor. Alternatively as illustrated in FIG. 2, each current source 111, 121, 231, 241, 251 may include a PMOS transistor that is operated substantially as a voltage controlled resistor. At a given gate-to-source voltage (Vgs) and drain-to-source voltage (Vds), a PMOS field effect transistor (FET) can be sized to have a specific resistance. Therefore, a PMOS FET can be configured/sized to produce a specific amount of drain current. However, if the Vds, or Vheadroom (e.g., Vdd−Vout), changes, then the drain current also changes. FIG. 4 provides an example of a circuit configured to provide substantially constant drain current if Vds or Vheadroom changes.

A source of the current source 111 is coupled to a supply voltage (Vdd), and a drain of the current source 111 is coupled to the output node 110. The current source 111 is responsive to the detection signal 112 via an inverter 216 coupled to a gate of the current source 111. The inverter 216 may be configured to invert the detection signal 112 and provide the inverted signal to the gate of the current source 111. To illustrate, if the detection signal 112 has a logical high voltage level, the inverter 216 may provide a signal having a logical low voltage level to the gate of the current source 111. In response to receiving the signal having the logical low voltage level, the current source 111 may operate as a pull-up transistor that couples the output node 110 to the supply voltage (Vdd) to generate the first current $I_1$ 191. As explained above, the detection signal 112 may have a logical high voltage level if the voltage of the output node 110 is below the threshold voltage (VthLow). Thus, the current source 111 may operate to provide the first current $I_1$ 191 to the output node 110 if the voltage of the output node 110 is below the threshold voltage (VthLow).

The control circuit 220 includes a delay element 217, a logical NOR gate 222, a flip-flop 224, a logical AND gate 226, and a multiplexer (MUX) 228. The delay element 217 may be configured to delay the detection signal 112 and to generate a first delayed version of the detection signal 202. For example, the delay element 217 may include one or more serially coupled buffers, inverters, or a combination thereof.

The MUX 228 is coupled to receive the first delayed version of the detection signal 202 at a first input and the detection signal 112 at a second input. A control input of the MUX 228 is coupled to an output (Q) of the flip-flop 224. The MUX 228 is configured to output the first delayed version of the detection signal 202 or the detection signal 112 based on a value of the control input.

The AND gate 226 has a first input coupled to the output of the MUX 228 and has a second input coupled to receive the detection signal 112. An output of the AND gate 226 is coupled to an input of the NOR gate 222. The output of the AND gate 226 is also coupled to a set (S) input of the flip-flop 224.

The NOR gate 222 has a first input coupled to the AND gate 226 and has a second input coupled to the output (Q) of the flip-flop 224. An output of the NOR gate 222 is coupled to a control terminal (e.g., a gate) of the current source 121.

The flip-flop 224 has the set (S) input coupled to the AND gate 226, a clock (C) input coupled to receive the clock signal 133, a data (D) input coupled to an output of the control circuit 230, and an active-low reset (RB) input coupled to receive an inverted version of the reset signal 114 (a "reset bar" signal) via an inverter 218. The output (Q) of the flip-flop 224 is coupled to the control input of the MUX 228 and to the NOR gate 222.

The control circuit 220 is configured to enable (e.g., activate) the current source 121 to generate the second current $I_2$ 192 based on the first delayed version of the detection signal 202. For example, when the output Q of the flip-flop 224, the detection signal 112, and the reset signal 114 have a logical low value (LO) (such that the active-low reset (RB) input receives a logical high value (HI)), and the detection signal 112 transitions from LO to HI, the first delayed version of the detection signal 202 transitions from LO to HI after the delay of the delay element 217. The MUX 228 outputs the first delayed version of the detection signal 202 to provide a HI signal to the AND gate 226. Because both inputs to the AND gate 226 are HI, the output of the AND gate 226 transitions to HI. The NOR gate 222 responds to the HI output from the AND gate 226 to activate the current source 121 (via a LO signal at the gate of the current source 121). In addition, the HI output from the AND gate 226 received at the S input of the flip-flop 224 sets and holds the output Q at HI. The MUX 228 also outputs the first delayed version of the detection signal 202 to the control circuit 230.

The control circuit 230 includes a delay element 227 coupled to receive the first delayed version of the detection signal 202 from the control circuit 230 and configured to generate a second delayed version of the detection signal 204. The control circuit 230 also includes a MUX 238, an AND gate 236, a NOR gate 232, and a flip-flop 234 that are configured to activate the current source 231 to provide a current ($I_3$) to the output node 110 responsive to the second delayed version of the detection signal 204 in a similar manner as the MUX 228, the AND gate 226, the NOR gate 222, and the flip-flop 224, respectively, of the control circuit 220 are configured to activate the current source 121 responsive to the first delayed version of the detection signal 202.

The other control circuits 240, 250 may include similar components and may operate in a substantially similar manner as the control circuits 220, 230. For example, the control circuit 240 may be configured to enable the current source 241 based on a third delayed version of the detection signal 206 to provide a current ($I_4$) to the output node 110. In a similar manner, the control circuit 250 may be configured to enable the current source 251 to provide a current ($I_{N+1}$) to the output node 110 based on an Nth delayed version of the detection signal (not shown).

Thus, if the voltage at the output node 110 falls below the voltage threshold (VthLow), the detection signal 112 may have a logical high voltage level and may cause the current sources 111, 121, 231, 241, 251 to activate in rapid succession based on delay times associated with the delay elements 217, 227, etc. In particular, the current source 111 may be configured to provide the current $I_1$ 191 to the output node 110 in response to the detection signal 112. The current source 121 and the control circuit 220 are included in a first incremental current stage 292 that is configured to provide the current $I_2$ 192 to the output node 110 in response to the first delayed version of the detection signal 202. The current source 231 and the control circuit 230 are included in a second incremental current stage 294 that is configured to provide the current $I_3$ to the output node 110 in response to the second delayed version of the detection signal 204. The current source 241 and the control circuit 240 are included in a third incremental current stage 296 that is configured to provide the current $I_4$ to the output node 110 in response to the third delayed version of the detection signal 206. The current source 251 and the control circuit 250 are included in an Nth incremental current stage 298 that is configured to provide the current $I_{N+1}$ to the output node 110 in response to an Nth delayed version of the detection signal.

Although four incremental current stages 292-298 are depicted, in other implementations any number "N" of incremental current stages may be included in the ATRA 106, where N may be any integer value greater than zero. As a non-limiting example, if N is equal to nine, there may be nine incremental current stages at the ATRA 106. As illustrated in FIG. 2, each incremental current stage includes a respective current source and a respective control circuit that is configured to provide an incremental current to the output node 110 in response to a respective delayed version of the detection signal 112. As the detection signal 112 propagates through the plurality of control circuits (e.g., from the MUX 228 to the delay element 227, from the MUX 238 to a delay element 237, etc.), the detection signal 112 causes the corresponding current sources to activate and the corresponding flip-flops to set (and store) a logical high voltage level output. By doing so, the current sources may provide current to the output node 110. Although in some implementations each of the delay elements of the incremental current stages 292-298 applies substantially equal delay and each of the current sources 109 generates substantially the same amount of current, in other implementations the delay elements may not apply substantially equal delay, one or more of the current sources 109 may generate a different amount of current (e.g., later-activated current sources may provide larger amounts of current than earlier-activated current sources), or a combination thereof.

If the detection signal 112 switches to a logical low voltage level (e.g., the voltage at the output node 110 is no longer less than the voltage threshold (VthLow)), the AND gates of the incremental current stages 292-298, responsive to the detection signal termination, output logical low values, and the successive activation of the current sources 111, 121, 231, 241, 251 stops. As a result, a relatively stable amount of current from the activated current sources is provided to the load 108. For example, the logical high voltage level of the detection signal 112 may cause incrementing current stages to sequentially activate until the detection signal 112 switches to a logical low voltage level (e.g., detection signal termination). After the detection signal termination, activated current stages may remain activated (until deactivated by another mechanism, such as in response to the clock signal 133 or in response to the reset signal 114, as explained below), and inactive current stages remain inactive.

After the detection signal termination, the activated current stages may be sequentially deactivated in responsive to the clock signal 133. In this case, the clock signal 133 corresponds to a deactivation clock that sequentially deactivates current stages. To illustrate, as each current stage is activated, the output (Q) of the flip-flop for that current stage transitions from LO to HI and is provided to the input (D) of the flip-flop of the preceding current stage. Non-activated current stages continue to output LO to their preceding current stages.

As an example, if the detection signal 112 transitions to LO after the incremental current stages 292 and 294 are activated but before the incremental current stage 296 is activated, the data (D) input of the flip-flop 234 receives a LO signal from the inactive current stage 296 and the set (S) input of the flip-flop 234 receives a LO signal from the AND gate 236. At the next pulse of the clock signal 133, the output (Q) of the flip-flop 234 transitions from HI to LO, deactivating the current source 231 and sending the LO signal to the data (D) input of the flip-flop 234 of the preceding current stage 292. In response to the next pulse of the clock signal 133, the output (Q) of the flip-flop 224 transitions from HI to LO, deactivating the current source 121.

For example, if the current sources 111, 121, 231, 241 are activated, after the detection signal termination, the current source 241 may be deactivated. The current source 231 may be deactivated after the current source 241 is deactivated, the current source 121 may be deactivated after the current source 231 is deactivated, and the current source 111 may be deactivated after the current source 121 is deactivated. Thus, based on the implementation shown with respect to FIG. 2, the current sources 241, 231, 121, 111 are turned off from right to left based on a determined clock period (e.g., at different time intervals). The clock period may be determined such that the voltage regulator circuit 102 has time to absorb the load current increment supplied by the deactivated current sources without incurring unacceptable output voltage droop (e.g., voltage droop that causes the regulated supply voltage to fall below a minimum required level for circuit operation). According to one implementation, the ATRA 106 may be "retriggerable" such that the current sources may sequentially activate (from left to right) if the voltage at the load (e.g., the voltage at the output node 110) falls below the threshold voltage (VthLow) again.

In the implementation of FIG. 2, if the detection signal 112 switches to a logical low voltage level prior to all of the flip-flops 224, 234 of the control circuits 220, 230, 240, 250 being set, the direct $V_{trip}$ input to the logical AND gates 226, 236 that drives the set inputs to the flip-flops 224, 234, as well as the logical NOR gates 222, 232 that drive the current sources 121, 231, 241, 251, stop any further setting of the flip-flops 224, 234 of the control circuits 220, 230, 240, 250. Once a particular flip-flop has been set, an output of the particular flip-flop switches the other input of the logical AND gate to the detection signal 112 through a multiplexer rather than selecting a path through the delay gates. By doing so, the detection signal 112 switches to the logical high voltage level (due to the voltage at the output node 110 dropping below the threshold voltage (VthLow)) before each flip-flop has been cleared. Thus, the setting takes place at the next in line un-set flip-flop without having to propagate the detection signal 112 through delay gates of set flip-flops.

According to one implementation, the setting of the flip-flops 224, 234 occurs relatively fast (e.g., "rapidly"). For example, the delay time of the delay elements 217, 227, 237 are similar to the delay time of the comparator circuit 152 of FIG. 1. To illustrate, the delay time of each of the delay elements 217, 227, 237 and the delay time of the comparator circuit 152 may be smaller (e.g., e.g., by one or more orders of magnitude) than a period of the clock signal 133. The delay time of the delay elements 217, 227, 237 and the magnitudes of the currents $I_1$, $I_2$, $I_3$ etc., may be set so that a rate of increase of current provided to the output node 110 substantially matches an increased load current from the output node 110 under a "worst-case" load current scenario (e.g., due to simultaneous activation of multiple processor cores) to hold the voltage at the output node 110 at or above a determined voltage level. The flip-flops 224, 234 of the control circuits 220, 230, 240, 250 may be cleared by clocking the control circuit 250 to the control circuit 220 (e.g., clocking from right to left). The clock period may be determined such that the voltage regulator circuit 102 has time to absorb the current that shifts from deactivating a current source.

Thus, the comparator circuit 152 generates the detection signal 112 (having a logical high voltage level), and the current sources 111, 121, 231, 241, 251 (e.g., a PMOS transistor array) activate in response to the detection signal 112 to supply extra current to the load 108. As long as the detection signal 112 has the logical high voltage level, the detection signal 112 (including delayed versions thereof) may propagate through the plurality of control circuits 220, 230, 240, 250 gradually activating the current sources 111, 121, 231, 241, 251 and providing additional current to the load 108. When enough current is being provided by the PMOS transistor array to elevate the voltage at the output node 110 above the threshold voltage (VthLow), activation of the current sources may stop. After activation of new current sources has stopped, the clock signal 133 may gradually clear the flip-flops that are "holding on" the activated current sources, thereby providing smaller increments of current for the voltage regulator circuit 102 to absorb.

Accordingly, the ATRA 106 of FIG. 2 enables the voltage regulator circuit 102 to use smaller values for the load capacitance while maintaining acceptable levels of voltage droop at the output node 110. The current sources (e.g., the PMOS devices) may be used as current shunts that can be scaled linearly or nonlinearly. In one example, the PMOS devices that are activated at later stages may be designed to be larger in size, and therefore, may provide greater current.

Figure 3:
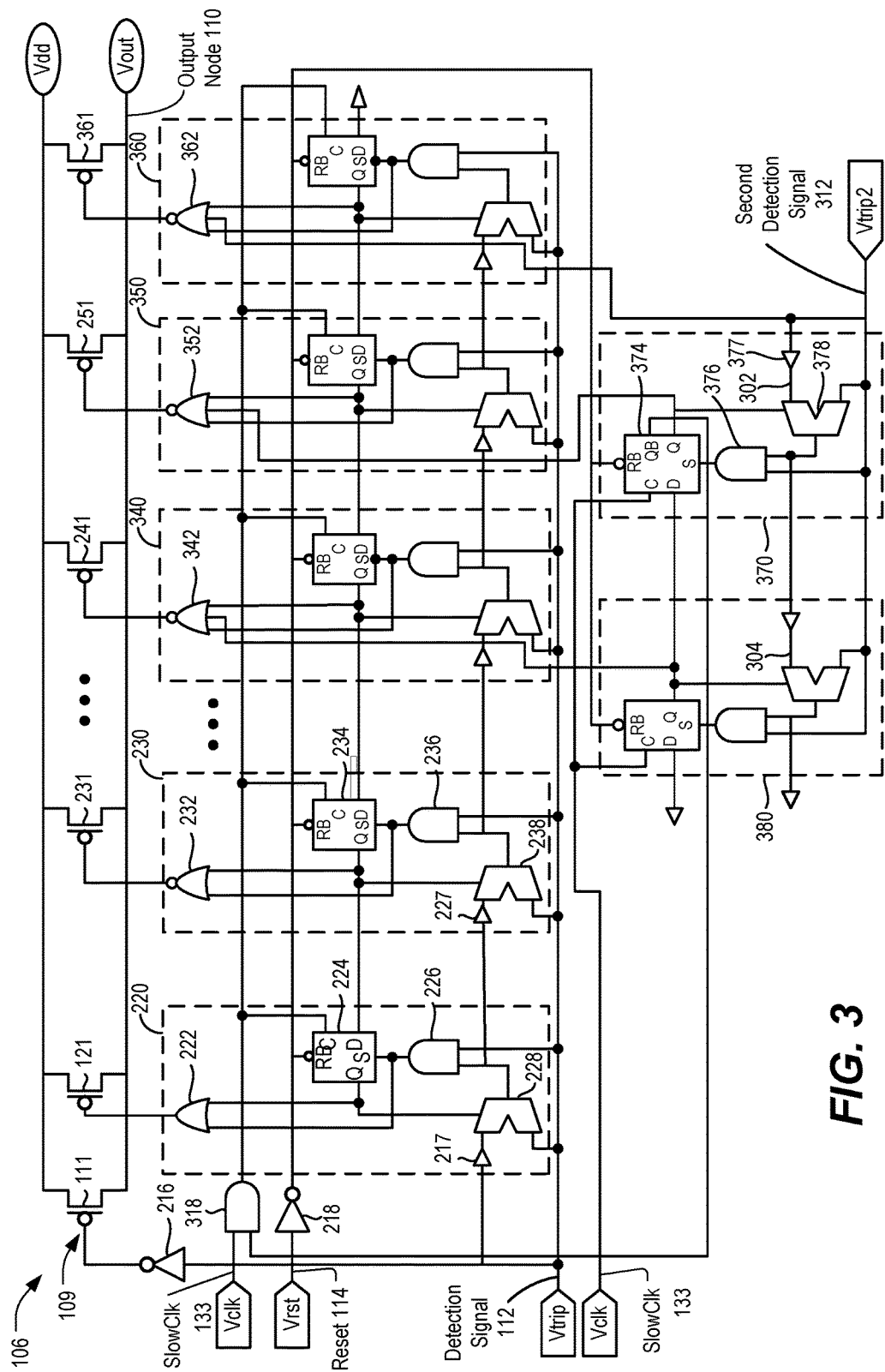
FIG. 3 is a diagram of another illustrative example of a device to stabilize a supply voltage.

Referring to FIG. 3, a circuit diagram of another particular implementation of the ATRA 106 is shown. One or more features of the ATRA 106 of FIG. 3 may be as described with reference to FIG. 1, FIG. 2, or both. For example, in FIG. 3, the ATRA 106 includes the control circuits 220, 230. As another example, in FIG. 3, the ATRA 106 includes current sources 109, such as the current sources 111, 121, 231, 241, 251.

In the example of FIG. 3, the ATRA 106 is coupled to receive a second detection signal 312 ($V_{trip2}$). The second detection signal 312 may be generated by the detection circuit 104 of FIG. 1. For example, the detection circuit 104 may be configured to generate the second detection signal 312 in response to the voltage at the output node 110 being below a second threshold voltage (VthLow2) that is less than the threshold voltage (VthLow).

FIG. 3 also illustrates that the ATRA 106 may include one or more NOR gates having a three input terminal configuration. For example, the ATRA 106 may include a control circuit 340 including a NOR gate 342 having a three input terminal configuration. As additional examples, the ATRA 106 may include a control circuit 350 including a NOR gate 352 having a three input terminal configuration and may also include a control circuit 360 including a NOR gate 362 having a three input terminal configuration. In the example of FIG. 3, the NOR gate 362 includes an input coupled to receive the second detection signal 312. One or more additional components of the control circuits 340, 350 may correspond to one or more components of the control circuits 220, 230, 240, 250 of FIG. 2.

The ATRA 106 may also include a control circuit 370 and a control circuit 380. The control circuit 370 includes a flip-flop 374, an AND gate 376, a delay element 377, and a MUX 378. The delay element 377 may be configured to delay the second detection signal 312 and generate a first delayed version of the second detection signal 302. For example, the delay element 377 may include one or more serially coupled buffers (e.g., source follower circuits), inverters, or a combination thereof.

The MUX 378 is coupled to receive the first delayed version of the second detection signal 302 at a first input and the second detection signal 312 at a second input. A control input of the MUX 378 is coupled to an output (Q) of the flip-flop 374. The MUX 378 is configured to output the first delayed version of the second detection signal 302 or the second detection signal 312 based on a value of the control input.

The AND gate 376 has a first input coupled to the output of the MUX 378 and has a second input coupled to receive the second detection signal 312. An output of the AND gate 376 is coupled to a set (S) input of the flip-flop 374.

The flip-flop 374 has the set (S) input coupled to the AND gate 376, a clock (C) input coupled to receive the clock signal 133, a data (D) input coupled to an output of the control circuit 380, and a low-activated reset (R) input coupled to receive the reset bar signal (e.g., the inverted version of the reset signal 114 generated by the inverter 218). A first output (Q) of the flip-flop 374 is coupled to an input terminal of the NOR gate 352. A second output (QB) of the flip-flop 374 is coupled to an AND gate 318.

The AND gate 318 includes a first input terminal coupled to receive the clock signal 133 and a second input terminal coupled to the flip-flop 374. The AND gate 318 includes an output terminal coupled to the control circuits 220, 230, 340, 350, 360.

During operation, the second detection signal 312 may enable (e.g., activate) a current source 361. For example, the detection circuit 104 may be configured to generate the second detection signal 312 in response to the voltage at the output node 110 being below a second threshold voltage (VthLow2) that is less than the threshold voltage (VthLow). The second detection signal 312 may have a logical high voltage level if the voltage at the output node 110 is less than the second threshold voltage (VthLow2). The logical high voltage causes the NOR gate 362 to output a logical low voltage to enable the current source 361. The current source 361 may provide a current to the output node 110.

The control circuit 370 is configured to enable (e.g., activate) the current source 251 to generate a current based on the first delayed version of the second detection signal 302. For example, after the second detection signal 312 transitions from a logical low voltage to a logical high voltage, the delay element 377 may generate the first delayed version of the second detection signal 302 after activation of the current source 361. The first delayed version of the second detection signal 302 causes the MUX 378 to output a logical high voltage, causing the AND gate 376 and the first output (Q) of the flip-flop 374 to output logical high voltages. The logical high voltage output by the first output (Q) of the flip-flop 374 causes the NOR gate 352 to output a logical low voltage, enabling (e.g., activating) the current source 251 to provide a current to the output node 110.

The control circuit 380 may include similar components and may operate in a substantially similar manner as the control circuit 370. For example, the control circuit 380 may be configured to enable the current source 241 based on a third delayed version of the detection signal 304 to provide a current to the output node 110.

Accordingly, the ATRA 106 of FIG. 3 may enable a "meet in the middle" technique to sequentially activate the current sources 109 to provide current to the output node 110. For example, in FIG. 3, the current sources 109 may sequentially activate from left to right based on the detection signal 112 (e.g., as described with reference to FIG. 2) and may also sequentially activate from right to left based on the second detection signal 312. To further illustrate, in FIG. 3, the current sources 121, 251 may be activated after activation of the current sources 111, 361, and the current sources 231, 241 may be activated after activation of the current sources 121, 251. As a result, the current sources 109 may be activated in a rapid manner, such as in response to the voltage at the output node 110 being below a second threshold voltage (VthLow2) that is less than the threshold voltage (VthLow).

Referring to FIG. 4, a device 400 is shown. In some implementations, the device 400 is integrated within the system 100 of FIG. 1. For example, the device 400 includes a circuit 450 that may be implemented as one or more of the current sources 109. In this case, a particular current source of the current sources 109 may include multiple transistors.

The device 400 may include one or more resistors, such as resistors 402, 404, 406, and 408. In FIG. 4, the resistor 402 is coupled to receive the voltage at the output node 110 to generate a first signal, and the resistor 404 is coupled to receive the supply voltage (Vdd) to generate a second signal.

The device 400 further includes a differential amplifier 412. The differential amplifier 412 includes a first input terminal (e.g., an inverting input terminal) coupled to receive the first signal from the resistor 402 and further includes a second input terminal (e.g., a non-inverting input terminal) coupled to receive the second signal from the resistor 404. The differential amplifier 412 is configured to generate a headroom voltage Vheadroom based on a difference between the first signal and the second signal. The headroom voltage Vheadroom may indicate an amount of headroom associated with the voltage at the output node 110 and the supply voltage (Vdd).

The device 400 further includes multiple comparator circuits 413, such as comparator circuits 414, 416, 418. The multiple comparator circuits 413 are coupled to the differential amplifier 412 and are coupled to receive the headroom voltage Vheadroom. For example, a first input terminal (e.g., an inverting input terminal) of each of the multiple comparator circuits 413 may be coupled to receive the headroom voltage Vheadroom.

Each of the multiple comparator circuits 413 may further include a second input terminal (e.g., a non-inverting input terminal) that is coupled to receive a corresponding reference voltage. For example, the second input terminal of the comparator circuit 414 may be coupled to receive a reference voltage Vth6. As additional examples, the second input terminal of the comparator circuit 416 may be coupled to receive a reference voltage Vth5, and the second input terminal of the comparator circuit 418 may be coupled to receive a reference voltage Vth0. The reference voltages Vth0-Vth6 may correspond to a range of voltages, such as if Vth0>Vth1>Vth6. The multiple comparator circuits 413 are configured to generate enable signals<6:0>, such as an enable signal<0>, an enable signal<5>, and an enable signal<6>.

The circuit 450 includes multiple not- and (NAND) gates 455. Each of the multiple NAND gates 455 includes a first input terminal configured to receive a corresponding signal of the enable signals<6:0>. For example, the multiple NAND gates 455 may include a NAND gate 456 having a first input terminal configured to receive the enable signal<6> from the comparator circuit 414. Each of the multiple NAND gates 455 includes a second input terminal coupled to an inverter 458. Each second input terminal is configured to receive an inverted version of a gate voltage Vgate (e.g., an activation signal) generated by the inverter 458.

The circuit 450 further includes multiple transistors 451. Source terminals of the multiple transistors 451 may be coupled to receive a voltage Vsource, and drain terminals of the multiple transistors 451 may be configured to generate a voltage Vdrain. Drain terminals of the multiple transistors 451 may be coupled to the output node 110.

The multiple transistors 451 may include a transistor 452 having a gate terminal coupled to receive the gate voltage Vgate. Other transistors of the multiple transistors 451 may include gate terminals coupled to output terminals of the NAND gates 455. For example, the multiple transistors 451 may include a transistor 454 having a gate terminal coupled to an output terminal of the NAND gate 456.

During operation, the comparator circuits 413 may output the enable signals<6:0>. Each value of the enable signals<6:0> may correspond to a logical high voltage in response to the corresponding reference voltage exceeding the headroom voltage Vheadroom. For example, the comparator circuit 414 may be configured to output a logical high voltage in response to the reference voltage Vth0 exceeding the headroom voltage Vheadroom. If a difference between the supply voltage Vdd and the voltage at the output node 110 is relatively small, headroom may be relatively low, and more of the comparator circuits 413 may generate logical high voltages (as compared to a higher headroom condition where the difference between the voltage Vdd and the voltage at the output node 110 is greater and where fewer or none of the comparator circuits 413 generates a logical high voltage).

The device 400 may be configured to adjust currents of the current sources 109 based on the headroom voltage Vheadroom. To illustrate, one or more of the current sources 109, such as the first current source 111 and the second current source 121, may include the circuit 450. In this example, the first current $I_1$ 191 of the first current source 111 and the second current $I_2$ 192 of the second current source 121 are adjustable based on the headroom voltage Vheadroom.

The implementation described with reference to FIG. 4 may compensate for a low headroom condition associated with the supply voltage Vdd and the voltage at the output node 110. For example, in cases where a difference between the supply voltage Vdd and the voltage at the output node 110 is relatively low, current generated by one or more of the current sources 109 may be reduced. To compensate for the reduced current, the device 400 may activate transistors of the multiple transistors 451 (e.g., to increase a magnitude of current provided to the output node 110). As headroom increases, the device 400 may deactivate transistors of the multiple transistors 451 (e.g., to decrease a magnitude of current provided to the output node 110). As a result, an amount of current provided to the output node 110 may remain substantially constant for a range of headroom conditions.

Figure 5:
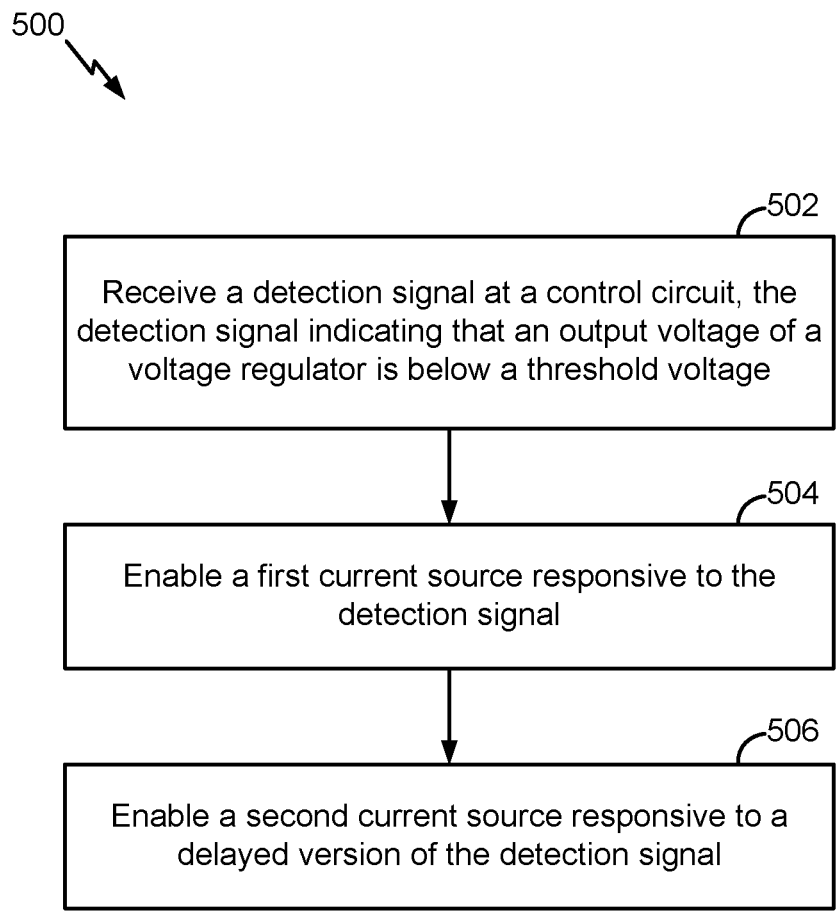
FIG. 5 is a method for providing current to an output node of a voltage regulator circuit.

Referring to FIG. 5, a method for providing current to an output node of a voltage regulator circuit is shown. The method 500 may be performed by the system 100 of FIG. 1. In particular, the method 500 may be performed using the ATRA 106 described with respect to FIGS. 1-3.

The method 500 includes receiving a detection signal at a control circuit, at 502. The detection signal indicates that an output voltage of a voltage regulator is below a threshold voltage. For example, referring to FIG. 1, the detection circuit 104 may generate the detection signal 112 if the voltage of the output node 110 (of the voltage regulator circuit 102) is below the threshold voltage VthLow. As described with respect to FIG. 2, the detection signal 112 may be provided to the ATRA 106. The ATRA 106 may include multiple control circuits 220, 230, 240, 250 that are coupled to receive either the detection signal 112 or the delayed versions of the detection signals 202, 204, 206.

A first current source that is responsive to the detection signal may be enabled, at 504. For example, referring to FIG. 2, the current source 111 may be enabled based on the detection signal 112. To illustrate, if the detection signal 112 has a logical high voltage level, the inverter 216 provides a signal having a logical low voltage level to the gate of the current source 111. In response to receiving the signal having the logical low voltage level, the current source 111 operates as a pull-up transistor and increases the voltage at the output node 110 based on the supply voltage (Vdd). For example, the current source 111 provides the current $I_1$ 191 to the output node 110 to increase the voltage at the output node 110. Thus, according to the method 500, enabling the first current source provides a first current to an output node coupled to the voltage regulator circuit.

A second current source that is responsive to a delayed version of the detection signal may be enabled, at 506. For example, referring to FIG. 2, the delay element 217 may delay the detection signal 112 and generate the first delayed version of the detection signal 202. Control circuitry (e.g., the MUX 238, the AND gate 236, the flip-flop 234, and the NOR gate 222) provides a logical low voltage signal to the gate of the current source 121 in response to the first delayed version of the detection signal 202. As a result, the current source 121 operates as a pull-up transistor and increases the voltage at the output node 110 based on the supply voltage (Vdd). For example, the current source 121 provides the current $I_2$ 192 to the output node 110 to increase the voltage at the output node 110. Thus, according to the method 500, enabling the second current source provides a second current to the output node.

According to the method 500, the second current source may be included in a first incremental current stage that is configured to provide the second current to the output node. For example, referring to FIG. 2, the current source 121 may be included in the first incremental current stage 292. The first incremental current stage 292 may enable the current $I_2$ 192 to be provided to the output node 110. The method 500 may also include sequentially activating current sources of multiple incremental current stages until a detection signal termination. For example, referring to FIG. 2, the current source 231 of the second incremental current source 294 may be activated after the current source 121 is activated, then the current source 241 of the third incremental current source 296 may be activated, and then the current source 251 of the fourth incremental current source 298 may be activated. Thus, the current sources 121, 231, 241, 251 may be sequentially activated. Sequential activation of the current sources 121, 231, 241, 251 may stop if detection signal termination occurs. For example, if the detection signal 112 switches from a logical high voltage level to a logical low voltage level, sequential activation of the current sources 121, 231, 241, 251 may stop.

According to one implementation of the method 500, activated current sources may remain activated and inactive current sources may remain inactive after the detection signal termination. For example, referring to FIG. 2, if the current sources 121, 231 are activated and the current sources 241, 251 are inactive when the detection signal 112 switches from a logical high voltage level to a logical low voltage level, the current sources 121, 231 may remain active and the current sources 241, 251 may remain inactive. The method 500 may also include sequentially deactivating the activated current sources in response to termination of the detection signal. For example, in the above scenario where the detection signal 112 switches from the logical high voltage level to the logical low voltage level, the current source 231 may deactivated followed by the current source 121.

According to one implementation, the method 500 also includes deactivating the activated current sources in response to a reset signal indicating that the output node is greater than a second voltage threshold. For example, referring to FIG. 1, the detection circuit 104 may generate the reset signal 114 if the voltage of the output node 110 is greater than the threshold voltage VthHi. To illustrate, the reset signal 114 may have a logical high voltage level and may be provided to the ATRA 106. Referring to FIG. 2, the reset signal 114 may be inverted by the inverter 218 to generate a signal having a logical low voltage level. The signal (with the logical low voltage level) may be provided to a low-activated reset terminal of each flip-flop 224, 234 to reset the flip-flops 224, 234 and deactivate the corresponding current sources 121, 231.

According to one implementation of the method 500, another instance of the detection signal may be received after some but not all of the activated current sources are deactivated in response to the detection signal termination. For example, referring to FIG. 2, the current sources 121, 231, 241 may be activated and the current source 251 may be inactive when the detection signal 112 switches from a logical high voltage level to a logical low voltage level. While the detection signal 112 has the logical low voltage level, the current source 241 may deactivate responsive to the clock signal 113. While the current sources 121, 231 remain activated, the detection signal 112 may switch back to a logical high voltage level. According to the method 500, the deactivated current sources may be sequentially activated in response to receiving the other instance of the detection signal. For example, in the above scenario, the current sources 241, 251 (e.g., the inactive current sources) may be sequentially activated in response to the detection signal 112 switching back to the logical high voltage level.

Figure 6:
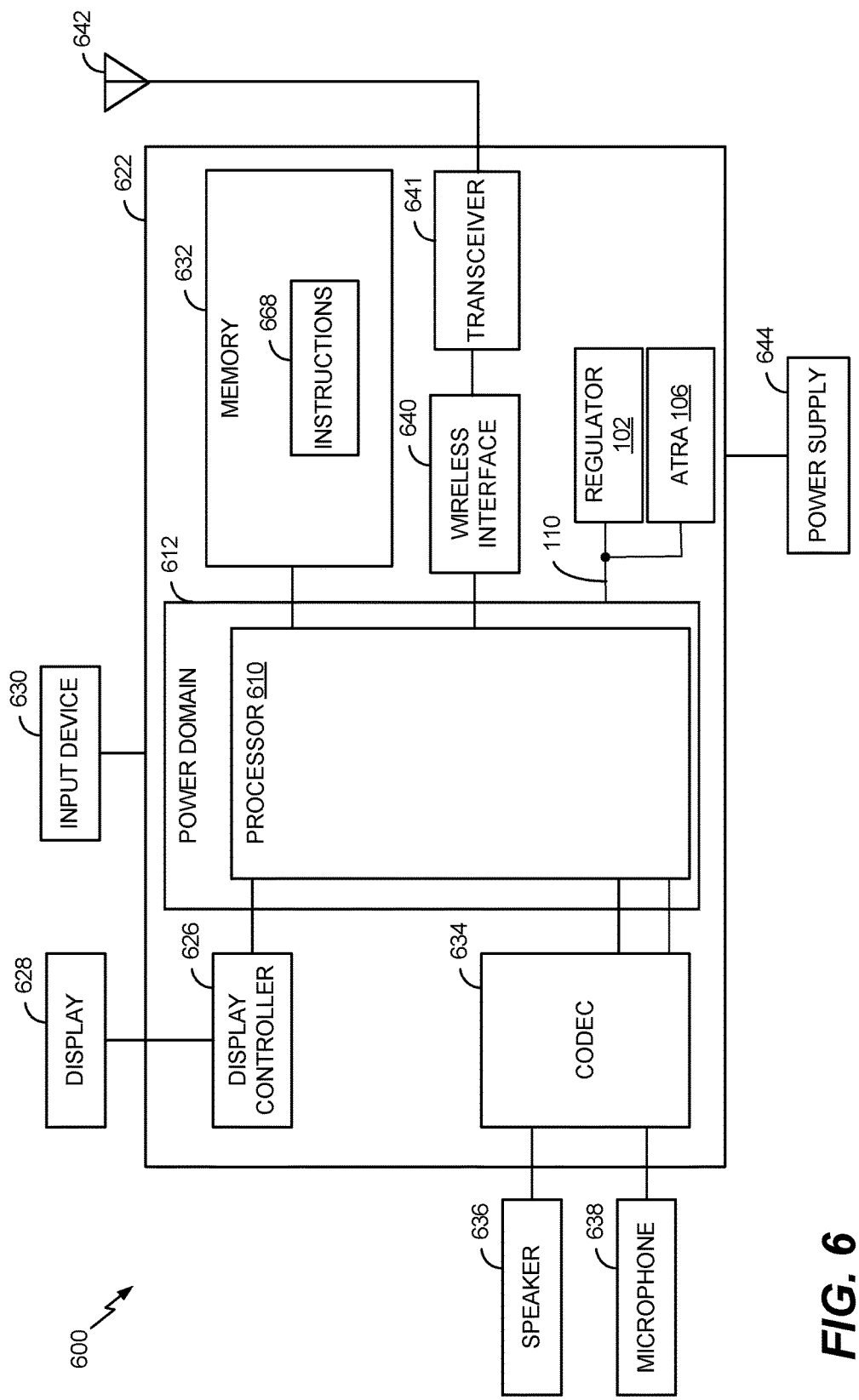
FIG. 6 is a block diagram of a device that may include components that are operable to reduce output voltage droop.

Referring to FIG. 6, a device 600 that includes components that are operable to perform techniques described with respect to FIGS. 1-5 is shown. The device 600 includes a processor 610, such as a digital signal processor or central processing unit, coupled to a memory 632. The processor 610 is in a power domain 612 that is coupled to the output node 110 of the voltage regulator circuit 102 of FIG. 1. The ATRA 106 is coupled to the output node 110. Although the processor 610 is shown in the power domain 612, in other implementations one or more other components such as a display controller 626, a CODEC 634, a memory 632, a wireless interface 640, or a transceiver 641 may be in the power domain 612 instead of (or in addition to) the processor 610.

The processor 610 may be configured to execute software, such as a program of one or more instructions 668, stored in the memory 632. The memory 632 may be a non-transitory computer-readable medium that includes instructions 668 for reducing glitches at the power domain 612. The instructions 668, when executed by the processor 610, may cause the processor to enable a first current source (e.g., the current source 111 of FIG. 2) that is responsive to a detection signal, such as when the ATRA 106 is implemented within the processor 610. The detection signal may indicate that an output voltage of a voltage regulator circuit, such as the voltage regulator circuit 102 of FIG. 1, is below a threshold voltage. The instructions 668 may also cause the processor 610 to enable a second current source (e.g., the current source 121 of FIG. 2) that is responsive to a delayed version of the detection signal. In some implementations, the processor 610 may be configured to operate in accordance with the method 500 of FIG. 5. For example, the instructions 668 may be executable to cause the processor 610 to perform operations described with respect to FIG. 5.

A wireless interface 640 may be coupled to the processor 610 and to an antenna 642. For example, the wireless interface 640 may be coupled to the antenna 642 via a transceiver 641. A coder/decoder (CODEC) 634 can also be coupled to the processor 610. A speaker 636 and a microphone 638 can be coupled to the CODEC 634. A display controller 626 can be coupled to the processor 610 and to a display device 628. In a particular implementation, the processor 610, the display controller 626, the memory 632, the CODEC 634, and the wireless interface 640 are included in a system-in-package or system-on-chip device 622. In a particular implementation, an input device 630 and a power supply 644 are coupled to the system-on-chip device 622. Moreover, in a particular implementation, as illustrated in FIG. 6, the display device 628, the input device 630, the speaker 636, the microphone 638, the antenna 642, and the power supply 644 are external to the system-on-chip device 622. However, each of the display device 628, the input device 630, the speaker 636, the microphone 638, the antenna 642, and the power supply 644 can be coupled to one or more components of the system-on-chip device 622, such as one or more interfaces or controllers.

One or more of the disclosed techniques may be implemented in a system or an apparatus, such as the device 600, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 600 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-6 may illustrate systems, apparatuses, or methods according to the teachings of the disclosure, the disclosure is not limited to these illustrated systems, apparatuses, or methods. One or more functions or components of any of FIGS. 1-6 as illustrated or described herein may be combined with one or more other portions of another of FIGS. 1-6. Accordingly, no single implementation described herein should be construed as limiting and implementations of the disclosure may be suitably combined without departing form the teachings of the disclosure.

In conjunction with the described techniques, an apparatus include means for providing a first current to an output node. The means for providing the first current may be responsive to a detection signal and is coupled, via an output node, to a means for regulating a voltage at the output node. For example, the means for providing the first current to the output node may include the ATRA 106 of FIGS. 1-3, the current source 111 of FIGS. 2-3, the device 400 of FIG. 4, the processor 610 programmed to execute the instructions 668 of FIG. 6, one or more other devices, circuits, modules, or any combination thereof. The means for regulating the voltage at the output node may include the voltage regulator circuit 102 of FIG. 1, the processor 610 programmed to execute the instructions 668 of FIG. 6, one or more other devices, circuits, modules, or any combination thereof.

The apparatus may also include means for providing a second current to the output node. For example, the means for providing the second current to the output node may include the ATRA 106 of FIGS. 1-3, the current source 121 of FIGS. 2-3, the device 400 of FIG. 4, the processor 610 programmed to execute the instructions 668 of FIG. 6, one or more other devices, circuits, modules, or any combination thereof.

The apparatus may also include means for enabling the means for providing the second current based on a delayed version of the detection signal. For example, the means for enabling the means for providing the second current may include the ATRA 106 of FIGS. 1-3, the control circuit 220 of FIGS. 2-3, the processor 610 programmed to execute the instructions 668 of FIG. 6, one or more other devices, circuits, modules, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
a first current source responsive to a detection signal and having an output coupled to a voltage regulator circuit via an output node;
a second current source coupled to the output node; and
a control circuit having an input responsive to the detection signal, a delay element coupled to the input, and an output coupled to the second current source, the control circuit configured to enable the second current source based on a delayed version of the detection signal.

2. The apparatus of claim 1, further comprising a detection circuit configured to generate the detection signal.

3. The apparatus of claim 1, wherein the first current source and the second current source comprise p-type metal oxide semiconductor (PMOS) transistors.

4. The apparatus of claim 1, wherein the control circuit comprises a flip-flop responsive to the delay element, wherein an output of the flip-flop is coupled to the output of the control circuit.

5. The apparatus of claim 1, wherein the first current source is configured to provide a first current to the output node in response to the detection signal, wherein the second current source and the control circuit are included in a first incremental current stage that is configured to provide a second current to the output node in response to the delayed version of the detection signal, and further comprising:
a second incremental current stage configured to provide a third current to the output node in response to a second delayed version of the detection signal.

6. The apparatus of claim 5, further comprising multiple incremental current stages configured to sequentially activate current sources until a detection signal termination.

7. The apparatus of claim 6, wherein after the detection signal termination, activated current sources are configured to be sequentially deactivated responsive to a deactivation clock.

8. The apparatus of claim 5, wherein the current sources are configured to be sequentially deactivated responsive to a reset signal, the reset signal indicating that a voltage at the output node is greater than a voltage threshold.

9. The apparatus of claim 5, wherein a first current of the first current source and a second current of the second current source are adjustable based on a headroom voltage.

10. The apparatus of claim 5, further comprising:
a detection circuit configured to generate the detection signal in response to a voltage at the output node being below a first threshold voltage, the detection circuit further configured to generate a second detection signal in response to the voltage at the output node being below a second threshold voltage that is less than the first threshold voltage; and
an incremental current stage coupled to the output node and configured to be activated responsive to another delayed version of the detection signal, responsive to a 3 delayed version of the second detection signal, or both.

11. A method comprising:
receiving a detection signal at a control circuit, the detection signal indicating that an output voltage of a voltage regulator circuit is below a threshold voltage;
enabling a first current source responsive to the detection signal;
enabling a second current source responsive to a delayed version of the detection signal, wherein the second current source is included in a first incremental current stage that is configured to provide a second current to an output node coupled to the voltage regulator circuit; and
sequentially activating current sources of multiple incremental current stages until a detection signal termination.

12. The method of claim 11, wherein enabling the first current source provides a first current to the output node and wherein enabling the second current source provides a second current to the output node.

13. The method of claim 11, wherein after the detection signal termination, activated current sources remain activated and inactive current sources are inactive.

14. The method of claim 13, further comprising sequentially deactivating the activated current sources responsive to termination of the detection signal.

15. The method of claim 13, further comprising deactivating the activated current sources responsive to a reset signal indicating that the output node is greater than a second voltage threshold.

16. The method of claim 11, further comprising:
after some but not all of the activated current sources are deactivated responsive to the detection signal termination, receiving another instance of the detection signal; and
in response to receiving the other instance of the detection signal, sequentially activating the deactivated current sources.

17. An apparatus comprising:
means for providing a first current to an output node, the means for providing the first current responsive to a detection signal and coupled, via an output node, to a means for regulating a voltage at the output node;
means for providing a second current to the output node; and
means for enabling the means for providing the second current based on a delayed version of the detection signal, wherein the means for providing the first current and the means for providing the second current are adjustable based on a headroom voltage.

18. The apparatus of claim 17, further comprising means for generating the detection signal.

19. The apparatus of claim 17, further comprising means for sequentially activating current sources until a detection signal termination, the current sources coupled to the output node.

20. The apparatus of claim 19, wherein after the detection signal termination, the activated current sources are configured to be sequentially deactivated responsive to a deactivation clock.

21. The apparatus of claim 19, wherein the current sources are configured to be sequentially deactivated responsive to a reset signal, the reset signal indicating that a voltage at the output node is greater than a voltage threshold.

22. A non-transitory computer-readable medium comprising instructions that, when executed by a processor, cause the processor to perform operations comprising:
enabling a first current source responsive to a detection signal indicating that an output voltage of a voltage regulator circuit is below a threshold voltage;
enabling a second current source responsive to a delayed version of the detection signal, wherein the second current source is included in a first incremental current stage that is configured to provide a second current to an output node coupled to the voltage regulator circuit; and
sequentially activating current sources of multiple incremental current stages until a detection signal termination.

23. The non-transitory computer-readable medium of claim 22, wherein enabling the first current source provides a first current to the output node and wherein enabling the second current source provides the second current to the output node.

* * * * *